Aug. 29, 1961　　　I. A. B. GAUNT ET AL　　　2,998,370
NUCLEAR REACTORS

Filed Sept. 25, 1957　　　　　　　　　　　　　　5 Sheets-Sheet 2

INVENTORS
IAN ALEXANDER BUTLER GAUNT
KEITH JAMES MITCHELL
BY
ATTORNEYS

Aug. 29, 1961    I. A. B. GAUNT ET AL    2,998,370
NUCLEAR REACTORS
Filed Sept. 25, 1957    5 Sheets-Sheet 5
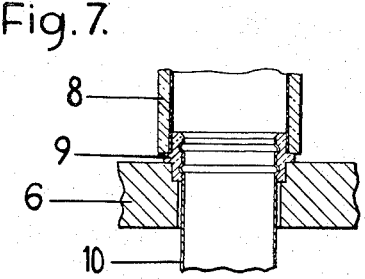
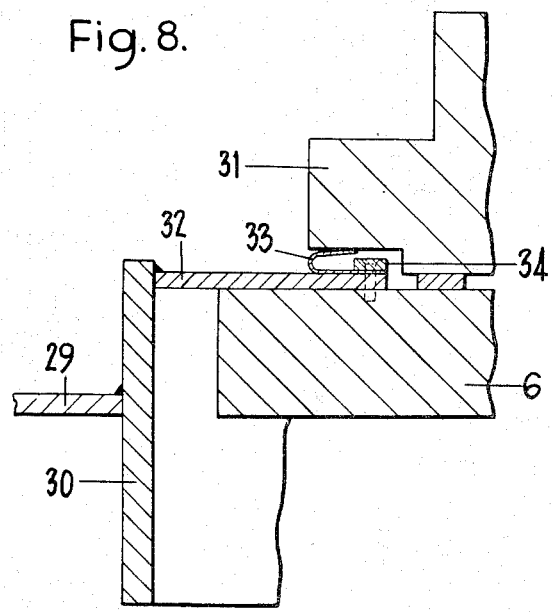
INVENTORS
IAN ALEXANDER BUTLER GAUNT
KEITH JAMES MITCHELL
ATTORNEYS

United States Patent Office 2,998,370
Patented Aug. 29, 1961

2,998,370
NUCLEAR REACTORS
Ian Alexander Butler Gaunt, Otford, and Keith James Mitchell, Higham, near Rochester, England, assignors to The General Electric Company Limited, London, England
Filed Sept. 25, 1957, Ser. No. 686,203
Claims priority, application Great Britain Sept. 27, 1956
12 Claims. (Cl. 204—193.2)

This invention relates to nuclear reactors and particularly to nuclear reactors having a core including units of moderating material assembled into a pile and resting on a base support or raft. The necessity for a base support or raft of the type herein envisaged may arise in a number of ways, but principally in the case where the core is required to be supported within an enclosing vessel generally spherical or part-spherical in shape without unduly straining the vessel.

In order that the base support or raft may adequately carry the weight of the core together with any additional load such as the weight of fuel elements contained therein, it is generally necessary to construct the support of a different material from that of the core.

Thus, graphitic carbon moderating material may be used and the base support or raft may be made of steel. Since steel has a considerably higher coefficient of thermal expansion than the graphitic carbon used as moderating material, operation of the nuclear reactor may cause separation of the base units of the core from one another with the possibility of serious distortion of the pile, since a single pile may be composed of several thousand units of moderating material. Alternatively, if the units of the pile are rigidly bound together, for example by circumferential restraints of the garter type, the lowest restraints have to withstand the frictional forces caused by the sliding of the carbon over the steel. These forces may be considerable, particularly in the dry atmosphere of a gas-cooled reactor. It may be possible to place rollers or ball bearings between the moderating material and the base support or raft, thus converting the sliding friction into rolling friction, but this has attendant economic and mechanical disadvantages. In the case of a core with substantially vertical ducts or channels through the base of which it is desired to charge or discharge fuel elements, if necessary during operation of the reactor, it may be particularly inconvenient to adopt such a solution and it is an object of the present invention to provide a nuclear reactor in which such disadvantages are substantially overcome.

According to the present invention, in a nuclear reactor of the type having a core including units of moderating material assembled into a pile and resting on a base support or raft having a higher coefficient of thermal expansion than the moderating material, the units are arranged in vertical columns held together at the top but free to move radially outward at the bottom with the base support or raft.

Thus, the top ends of the columns form a cap for the pile as a whole, while their lower ends may be individually attached to the base support or raft at regular intervals so as to "breathe," or move regularly to and from each other during thermal cycling of the reactor, such "breathing" being normally arranged to vary in a substantially linear fashion from a maximum at the base of the pile to a minimum at the cap.

The units forming a single column may be kept in register with one another by keys and mating recesses or grooves machined into the end faces of the units, which may be of the kind described in the specification accompanying United States patent application Serial No. 726,887 filed April 7, 1958 by Ian Alexander Butler Gaunt for Graphite Moderator Units, now abandoned, corresponding to British patent application No. 11818/57 dated October 4, 1957. Such an arrangement ensures flexibility, since the number of units will generally be large enough to provide a correspondingly large number of joints in each column. The top ends of the columns may then be rigidly held together by garter restraints having the same coefficient of thermal expansion as the moderating material, while the lower end of each column is attached to the base support or raft by spigot or the like means.

While it is necessary to have some form of restraint for the layers of pile units below the top cap in order that the body should form a stable structure, restraints of the garter or any other type which tend to hold the units rigidly together cannot be used since the effect would be to produce a waist towards the bottom of the pile, only the bottom layer or layers of units moving with the base support or raft during thermal cycling. The "breathing" action would thus not be substantially linear, the bottom units of the structure would be overstrained and any channels provided for the charge or discharge of fuel elements through units towards the outside of the pile would be too distorted to fulfill their function adequately. In accordance with the invention, therefore, such restraint is provided by members attached to substantially vertical bars or channels, each bar or channel being pivotally attached at one end to the base support or raft, or to a base supporting structure arranged to expand therewith, and at the other end to the top of the pile. Thus as the pile expands under the effect of temperature, the bars or channels pivot about their attachments to the raft or base supporting structure due to differential expansion between the latter and the moderating material.

The members may be attached to the bars or channels through legs which may be adjusted so as to exert a slight locating force on the pile through the members. These legs may be pivoted at both ends to permit the bars or channels to expand vertically at a greater rate than the moderating material.

One advantage of the arrangement according to the invention is that, since the upper part of the core of a reactor incorporating the arrangement will normally run at a higher temperature than the lower, the differential thermal expansion of the core itself will tend to a considerable extent to offset the overall expansion of the lower part due to the opening out of the columns. Thus the core may be less distorted during operation than if it had been tightly constrained throughout and supported for example on ball or roller bearings.

A nuclear reactor according to the present invention will now be described by way of example with reference to FIGURES 1 to 8 of the accompanying drawings. The drawings show parts of the reactor core, which is supported inside a pressure vessel in such a way as to allow coolant gas such as carbon dioxide under pressure to pass up through passages or ducts in the core, abstracting heat from fuel elements supported therein and being subsequently discharged from the top of the core into heat exchangers, where the heat given up by the gas is used to generate steam for use in turbo-alternator plant. In the drawings:

FIGURE 7 shows a detail of the manner in which the moderator columns are spigotted into the base support or raft.

FIGURE 8 shows a detail of the gas seal between the periphery of the moderator structure and the base support or raft.

Figure 1:
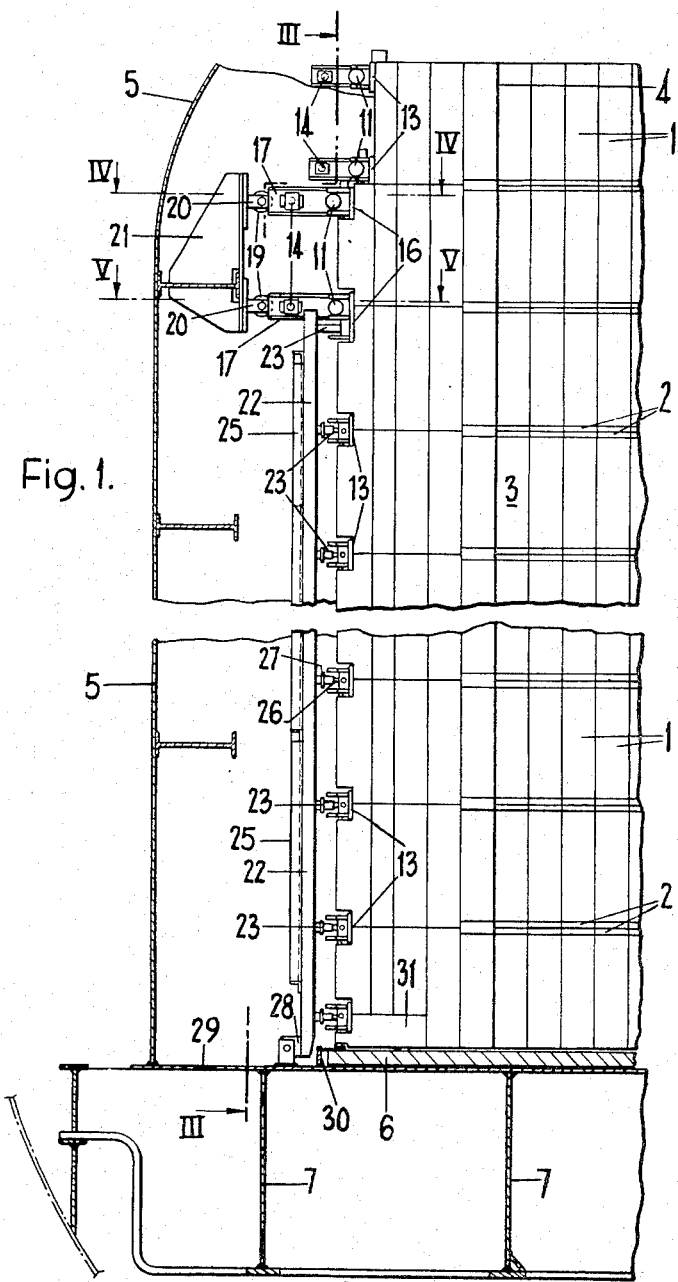
FIGURE 1 shows a part sectional elevation of the reactor core.
Figure 2:
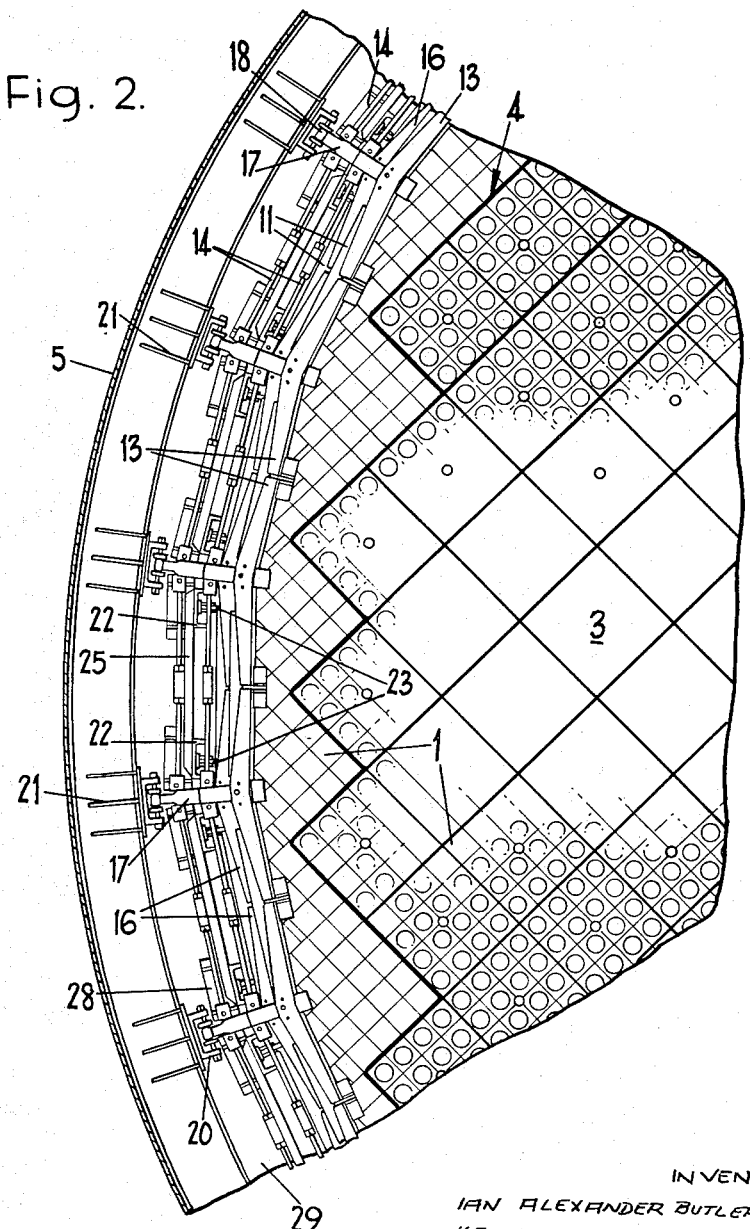
FIGURE 2 shows a fragmentary plan of the core.

Referring more particularly to FIGURES 1 and 2 of the drawings, the reactor core includes units of graphite moderating material in the form of bricks such as 1 or tiles such as 2 assembled into a pile 3. The pile has the shape of a twenty-eight sided polygon in cross-section, and has substantially vertical sides. It is composed of the moderator proper, situated in the middle of the pile 3, and a series of units placed around the moderator and constituting a neutron reflector. The boundary between moderator and reflector is indicated by the heavy dividing line 4 in FIGURE 2 and reflector layers are also provided at the top and bottom of the moderator.

As will be seen from FIGURE 1, the outermost columns of moderator units, corresponding to the reflector, are composed of bricks 1 not separated by tiles 2 except in the case of the innermost reflector column, which is formed of bricks separated by a single layer of tiles having twice the thickness of the moderator tiles 2.

The moderator itself is composed of bricks 1 separated by two layers of tiles 2. The reason for this construction lies in the growth under irradiation, or Wigner growth, of the graphite moderator. In order to allow for this growth, the bricks 1 in a given moderator layer are separated from each other and only the tiles 2 are contiguous in one lateral direction. Wigner growth is considerably greater in a direction at right angles to the grain of the graphite than parallel to the grain and advantage is taken of this fact in known fashion by arranging that one layer of tiles abuts in a lateral direction corresponding to the direction of grain of the tiles, while the other layer of tiles abuts in a direction at right angles to the first layer. The direction of the grain of the bricks themselves is arranged to be vertical.

The bricks and tiles in a given column are kept in register with one another by keys and mating recesses machined into their end faces; the general arrangement is described in detail in the specification accompanying aforesaid patent application, and it is sufficient here to state that each abutting face is of substantially square cross-section, with upstanding keys on two opposite edges and mating recesses on the remaining two edges. A central orifice is bored through each unit, such orifices together forming a continuous duct or channel down through the moderator from top to bottom. These ducts or channels, which are not shown, are provided for fuel elements or "flattening" elements and also to allow coolant gas under pressure to be passed up through the ducts or channels and abstract heat from the elements contained therein. Additional ducts or channels, passing from the top of the pile through the moderator, are also provided for control rods. The general arrangement of the pile units, which is substantially conventional in character, thus provides a series of moderator columns composed of units keyed to one another, the number of units being sufficiently large to ensure some degree of flexibility of the column. These columns are arranged adjacent each other and in fact abut through the tiles 2.

The above arrangement is slightly modified at different parts of the pile; for example, the top two pairs of tile layers are machined to be contiguous in both rectangular directions at once and have their grain in a vertical direction; the advantage of this will be outlined below, Wigner growth being less in this area because the temperature is higher and the graphite becomes saturated with stored energy at a low level. The top layer of the reflector bricks is actually machined to be contiguous and to form a substantially rigid cap for the pile; the outermost row of bricks on this layer is omitted, to give sufficient clearance from the reactor shell or pressure vessel 5. Again, vertical ducts or channels are not provided in the side reflector; and not all the reflector units are of substantially square section since it is necessary to transfer from the square lattice pattern to the twenty-eight sided shape. Only the square-sectioned bricks are keyed to one another. Other reflector bricks are merely laid end to end and no allowance is made for Wigner growth since the flux level of irradiation is small and it is desirable to keep the density of the reflector as high as possible. Thermocouple cables are laid in the lower of each pair of tile layers, and these are arranged so that there are four in each layer in a different quadrant from those in the layer beneath, the cables in consecutive layers being 90° removed from each other so that they virtually spiral upwards from the bottom layers. This and much other equipment, such as arrangements for the detection of burst fuel elements, element charge and discharge and reactor servicing apparatus including control rod positioning are in practice associated with the pile but are not described or shown here since they are not relevant to the present invention.

The whole core of the reactor, comprising the pile and fuel elements and other apparatus contained therein, rests on a base support in the form of a raft. This raft is composed of a number of support plates 6 laid on a grid 7. The support plates 6 are jacked and levelled in position to form a true surface for the bottom (reflector) layer of the pile. The invention provides that each reflector brick 8 (FIGURE 7) of this bottom layer, which brick 8 forms the lower end of a column extending to the top of the pile, is individually attached to a support plate 6; this attachment is effected both by the weight of the column and by a spigot 9 which, as shown, may also have a tube 10 fixed into it for charging and discharging fuel elements. The spigots 9 are a loose fit in holes in the support plates 6 and are accurately spaced from each other by means of intermediate spacers so as to form an accurate register into which the reflector bricks 8 fit at regular intervals by means of a counter-bore in the lower ends of the vertical ducts or channels in the bricks. Alternatively, in the area of the bottom layer of the side reflector where there are no ducts or channels bored in the bricks, there is, merely a counter-bore provided in one end of the brick of sufficient depth to accept the end of the spigot 9; the outermost layer of these bricks is laid horizontally to accept the weight of the non-square section "packing" bricks. While in this latter area any Wigner growth is so low that it can be accommodated in the small clearances between the spigots 9 and the bricks, it is advisable that the remainder of the bottom reflector bricks should be arranged so as not to be contiguous when the reactor is in its "cold" or inoperative condition, thus providing for any future growth under irradiation.

When the reactor warms up during operation, the raft composed of the support plates 6 will expand. The support plates 6 are made of steel, which has a considerably higher coefficient of thermal expansion than the graphite moderating material. Alternative solutions of this problem have already been discussed and their limitations defined; the present invention provides that the base of the pile expands radially outward at the same rate as the raft while the temperature of the pile is increasing. This is effected by the spigoting of the graphite directly into the support plates 6, and in consequence the pile opens out at the base, the individual columns of units becoming separated at the bottom by reason of the greater expansion of the steel. The top ends of the columns are rigidly held together to form a cap for the pile; the following description outlines the type of restraint used for this purpose, and also the restraint arrangement employed to ensure that the movement of the columns to and from each other during thermal cycling varies substantially linearly from a maximum at the base of the pile to a minimum at the cap. In order that this should happen, the restraint arrangement must move at the base at the same rate as the steel and at the top at the same rate as the graphite.

Figure 3:
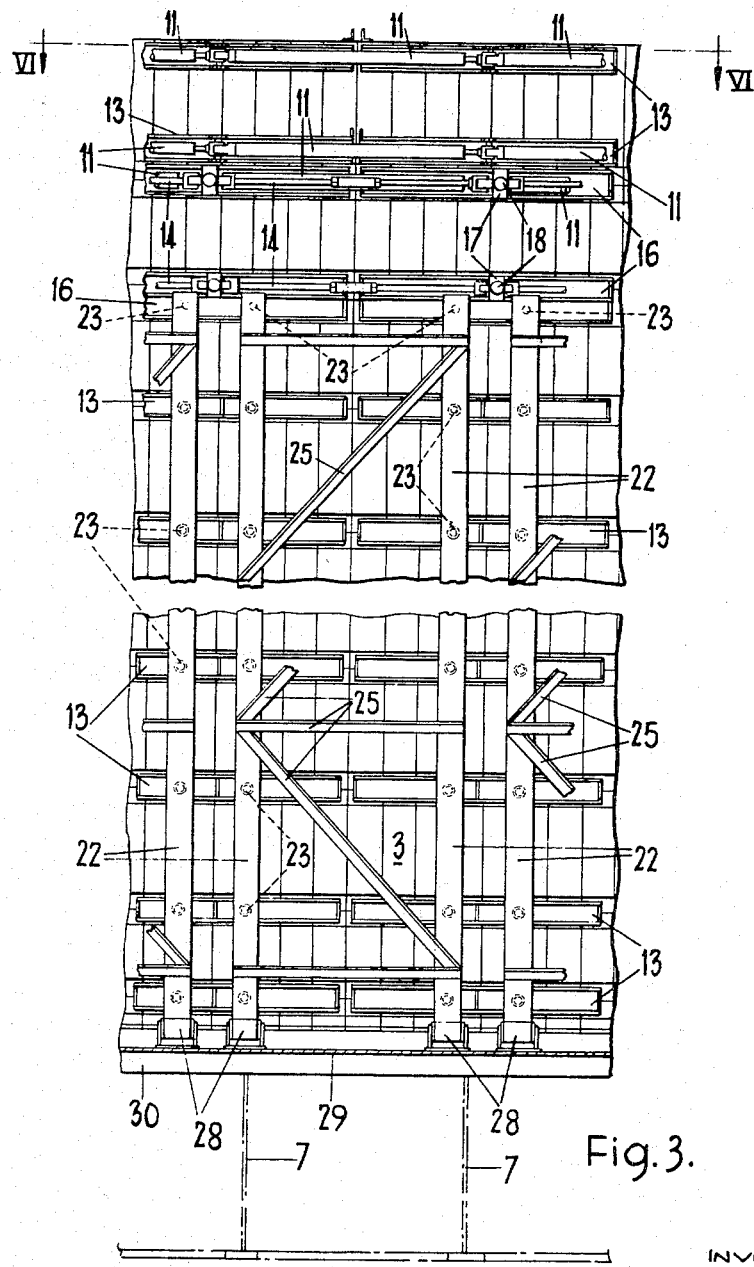
FIGURE 3 shows a view on the line III—III of FIGURE 1.
Figure 6:
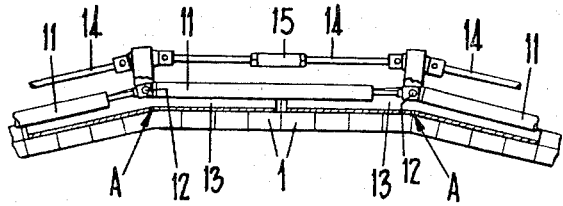
FIGURE 6 shows a section on the line VI—VI of FIGURE 3.

Referring more particularly to FIGURES 1 and 3, the top two layers of the pile are held together as a rigid cap by means of four circumferential garter-type restraints 11. These garter-type restraints are compensated to have the same coefficient of thermal expansion as graphite, and may be formed in known manner from a plurality of members hinged together and each composed of a number of concentric tubes formed alternately of mild steel and stainless steel. FIGURE 6 shows how each hinged member is hinged at points 12 to its neighbours and to members 13 of the beam type constituting corner restraints for the pile cap. These corner restraints 13 are fitted at the junction of each layer of reflector bricks and form "hands" across each corner A of the pile, holding the structure together.

If a hinged member of a garter-type restraint 11 were to fail, the units of the top cap might be loosened and the columns of moderating material displaced. To guard against this possibility, an uncompensated garter-type restraint 14 is provided. This is set at a greater radius than the compensated restraint 11 and forms, in effect, a parallel linkage therewith. During construction of the pile, the units of moderating material are restrained first of all by the compensated restraints 11 until the pile cap is properly located, when the uncompensated restraints 14 are tightened down through screwed links 15. During operation of the pile, the uncompensated restraints 14 expand thermally to a greater extent than the compensated restraints 11. They therefore loosen, and all the restraining load is taken by the compensated garter-type restraints 11. If one of the latter should fail, the structure relaxes slightly to an extent determined by the degree of initial tension in the uncompensated restraints 14, which then hold the cap of the structure together.

Figure 4:
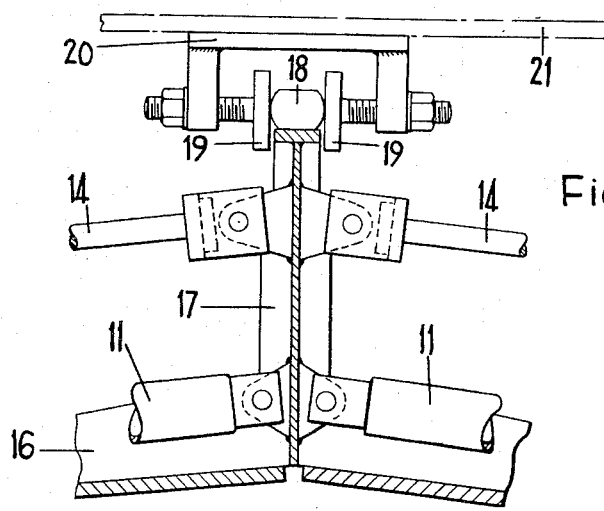
FIGURE 4 shows a section on the line IV—IV of FIGURE 1.
Figure 5:
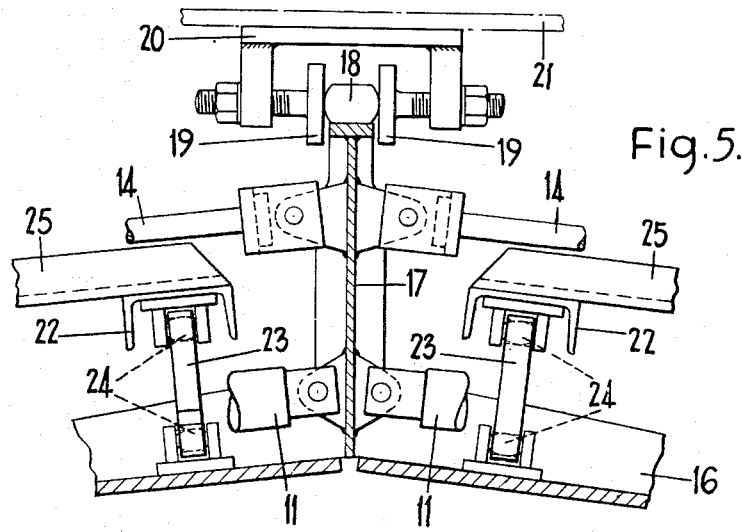
FIGURE 5 shows a section on the line V—V of FIGURE 1.

Slightly modified corner restraints 16 are used in connection with the second layer of bricks from the top of the pile; FIGURES 4 and 5 show details of the modified corner restraint members, which are fitted with radial extensions 17 to which rounded end pieces 18 are secured. Each end piece 18 is located between buffers 19 adjustably attached through brackets 20, 21 to a reactor shell 5. These extensions 17 form rotational restraints acting so as to prevent the top of the pile from twisting.

Referring to FIGURE 5, substantially vertical bars or channels 22 of steel are attached through legs 23 to the members 16 forming the corner restraints. Each leg 23 is pivoted at its ends as shown at 24 so that the attachment to both bar 22 and corner restraint member 16 is pivotal and, due to the shape of the pivot pins, capable of accommodating small distortions. Referring also to FIGURES 1 and 3, the vertical channels 22 are tied rigidly together in pairs by means of bolted-on strutting 25. The channels 22 and strutting 25 are of steel and accordingly expand to a greater extent than the corner restraint members 16, which expand with the graphite moderating structure. The pivoting 24 is such as amply to accommodate this differential expansion. As may be seen from FIGURE 1, each of the legs 23 below the top layer, which locates the top of the pairs of channels 22, is also adjustable longitudinally. Such longitudinal adjustment may be made by means of screws 26 and abutting clamping flanges 27.

The pairs of channels 22 (FIGURES 1 and 3) are pivotally attached at their lower ends 28 to the base supporting structure 29. This supporting structure 29 forms an extension of the grid 7 in the form of an imperforate annular plate to which the shell 5 is welded, the inner rim of the annulus being attached to a vertical kerb 30 against which the raft formed by the support plates 6 is arranged to abut by means of locating screws (not shown). This base supporting structure 29, which is also of steel, is thus arranged to expand with the raft when the temperature of the pile increases.

The effect of an increase in temperature of the pile upon the channels 22 is to cause them to pivot at their lower ends 28 due to the differential expansion between the steel support plates 6, together with the supporting structure 29, and the graphite moderating material of the pile cap. The lower and adjustable legs 23 are initially set to exert a slight locating force on the pile through the corner restraint members 13, and their pivoted attachment permits the channels 22 to expand vertically at a greater rate than the graphite, while keeping the corner restraints in position.

The system of channels 22, legs 23 and corner restraints 13 or 16 therefore forms a restraint arrangement which allows the individual columns of graphite units to "breathe," or move regularly to and from each other during thermal cycling, and encourages such "breathing" to vary as far as possible linearly from a maximum at the base of the pile where the columns are spigotted into the raft to a minimum at the top cap of the pile.

As was previously mentioned, the top two pairs of tile layers are composed of tiles whose grain is vertical in direction; the reason for this is that the coefficient of thermal expansion of the lower of these two pairs of tile layers is thereby kept equal to that of the top (reflector) layer of bricks, since the expansion of graphite under heat varies with the direction of the grain and the top reflector is, in this example, of the same material as the tiles. Thus, the temperature difference across these two layers of bricks and tiles being only of the order of 10°, the cap which they form for the pile under the influence of the garter restraints 11 expands radially approximately as a whole. This top cap is in addition prevented from rotating or moving sideways by the extensions 17 on the corner restraints 16.

For completeness, it should be observed that proper precautions must be taken to ensure that the gas entering the base of the reactor core passes through the ducts in the core. For this purpose a gas seal is provided round the periphery of the base of the pile. FIGURE 8 shows how the gas seal is provided between a horizontal reflector brick 31 and support plate 6. A plate 32 is welded to the kerb 30 and rests on the support plate 6. The seal is made between the plate 32 and brick 31 and consists of a continuous U-shaped stainless steel piece 33 held down by a bolted bar 34 which acts as a clamp holding the plates 32 and 6 together. The U-shaped piece 33 is arranged so that the gas pressure will tend to open it up against the brick 31 and thus tighten the seal. An additional gas seal is necessary to prevent leakage of gas up between the graphite columns during "breathing" when the columns are separated, and this may take the form of a thin sheet of mild steel laid on the support plates 6 so as to form a top skin to the raft, or a number of thin sheets each of the same area as a support plate 6 and placed between the centres of adjacent support plates so as to overlap the gaps between them.

A reactor of the kind described in the above example may be designed to run at a temperature of approximately 200° C. at the base of the pile and 400° C. at the top. Then differential expansion of the core of the reactor will act to diminish the difference in expansion of the top and bottom of the pile due to the fact that the bottom of the pile moves with the steel raft. Thus, while the expansion of this raft may be 2½ times as great as graphite, it has been estimated in one construction that the radial expansion of the steel raft is 0.68" while that of the graphite at the top of the pile is 0.58". The graphite at the top thus expands nearly as fast as the steel at the bottom, and the whole structure remains substantially undistorted during operation.

We claim:

1. A core arrangement for a nuclear reactor, comprising blocks of moderating material and a base supporting member of material having a coefficient of thermal expansion greater than that of the moderating material, said blocks being assembled in layers and in a plurality of substantially vertical columns in juxtaposition upon said base member, and garter restraining means, said garter restraining means being arranged to clamp together the blocks in a said layer near the top of the assembly and being adapted to have substantially the same coefficient of thermal expansion as the moderating material, the blocks in each column below said clamped layer being arranged so that the bottom of each column is free to move with thermal movement of that part of the base member with which it is associated.

2. A core arrangement as claimed in claim 1, and comprising spigot means, said spigot means being associated with said base member and engaging the bottom block of at least one said column to key the said bottom block in relation to said base member.

3. A core arrangement for a nuclear reactor, comprising blocks of moderating material and a base supporting member of material having a coefficient of thermal expansion greater than that of the moderating material, said blocks being assembled in layers and in a plurality of substantially vertical columns in juxtaposition upon said base member, clamping means, said clamping means being adapted to clamp together the blocks in a said layer near the top of the assembly, and intermediate restraining means, said intermediate restraining means being adapted to restrain a layer of blocks intermediate between the bottom layer and said clamped layer, means being provided which are adapted to support said intermediate restraining means in relation to said base member, and the blocks in each column below said clamped layer being arranged so that the bottom of each column is free to move with thermal movement of that part of the base member with which it is associated.

4. A core arrangement as claimed in claim 3, and comprising spigot means, said spigot means being associated with said base member and engaging the bottom block of at least one said column to key the said bottom block in relation to said base member.

5. A core arrangement for a nuclear reactor, comprising blocks of moderating material and a base supporting member of material having a coefficient of thermal expansion greater than that of the moderating material, said blocks being assembled in layers and in a plurality of substantially vertical columns in juxtaposition upon said base member, clamping means, said clamping means being adapted to clamp together the blocks in a said layer near the top of the assembly, and intermediate restraining means, said intermediate restraining means being adapted to restrain a layer of blocks intermediate between the bottom layer and said clamped layer, and a plurality of substantially vertical members, each said vertical member being pivotally mounted at one part thereof in relation to said base member and at another part thereof in relation to said intermediate restraining means, and the blocks in each column below said clamped layer being arranged so that the bottom of each column is free to move with thermal movement of that part of the base member with which it is associated.

6. A core arrangement as claimed in claim 5, and comprising spigot means, said spigot means being associated with said base member and engaging the bottom block of at least one said column to key the said bottom block in relation to said base member.

7. A core arrangement for a nuclear reactor, comprising blocks of moderating material and a base supporting member of material having a coefficient of thermal expansion greater than that of the moderating material, said blocks being assembled in layers and in a plurality of substantially vertical columns in juxtaposition upon said base member, clamping means, said clamping means being adapted to clamp together the blocks in a said layer near the top of the assembly, a plurality of intermediate restraining means, each said intermediate restraining means being adapted to restrain one of the layers of blocks intermediate between the bottom layer and said clamped layer, a plurality of substantially vertical members, each said vertical member being pivotally mounted at one end thereof in relation to said base member and also at intermediate parts in relation to each said intermediate restraining means, and the blocks in each column below said clamped layer being arranged so that the bottom of each column is free to move with thermal movement of that part of the base member with which it is associated.

8. A core arrangement as claimed in claim 7, and comprising spigot means, said spigot means being associated with said base member and engaging the bottom block of at least one said column to key the said bottom block in relation to said base member.

9. A core arrangement in accordance with claim 5, in combination with a containment vessel for said base member and said block assembly, and comprising at least one rotational restraint, said rotational restraint being adapted to interact between said vessel and at least one of said vertical members to limit twisting movement of said block assembly.

10. In combination, a core arrangement for a nuclear reactor, comprising blocks of moderating material and a base supporting member of material having a coefficient of thermal expansion greater than that of the moderating material, said blocks being assembled in layers and in a plurality of substantially vertical columns in juxtaposition upon said base member, and clamping means, said clamping means being adapted to clamp together the blocks in a said layer near the top of the assembly, the blocks in each column below said clamped layer being arranged so that the bottom of each column is free to move with thermal movement of that part of the base member with which it is associated, and a containment vessel for said base member and said block assembly and comprising at least one rotational restraint, said rotational restraint being adapted to interact between said vessel and said clamping means to limit twisting movement of said block assembly.

11. In combination, a core arrangement for a nuclear reactor, comprising blocks of moderating material and a base supporting member of material having a coefficient of thermal expansion greater than that of the moderating material, said blocks being assembled in layers and in a plurality of substantially vertical columns in juxtaposition upon said base member, clamping means, said clamping means being adapted to clamp together the blocks in a said layer near the top of the assembly, and intermediate restraining means, said intermediate restraining means being adapted to restrain a layer of blocks intermediate between the bottom layer and said clamped layer, and the blocks in each column below said clamped layer being arranged so that the bottom of each column is free to move with thermal movement of that part of the base member with which it is associated, and a containment vessel for said base member and said block assembly and comprising at least one rotational restraint, said rotational restraint being adapted to interact between said vessel and said clamping means to limit twisting movement of said block assembly.

12. In combination, a core arrangement for a nuclear reactor, comprising blocks of moderating material and a base supporting member of material having a coefficient of thermal expansion greater than that of the moderating material, said blocks being assembled in layers and in a plurality of substantially vertical columns in juxtaposition upon said base member, clamping means, said clamping means being adapted to clamp together the blocks in a said layer near the top of the assembly, and intermediate restraining means, said intermediate restraining means being adapted to restrain a layer of blocks intermediate between the bottom layer and said clamped layer, and the blocks in each column below said clamped layer being arranged so that the bottom of each column is free to move with thermal movement of that part of the base member with which it is associated, and a containment vessel for said base member and said block assembly, and comprising at least one rotational restraint, said rotational restraint being adapted to interact between said vessel and said intermediate restraining means to limit twisting movement of said block assembly.

References Cited in the file of this patent

UNITED STATES PATENTS

| | | |
|---|---|---|
| 2,671,817 | Groddeck | Mar. 9, 1954 |
| 2,838,451 | Long et al. | June 10, 1958 |
| 2,852,457 | Long et al. | Sept. 16, 1958 |

OTHER REFERENCES

Hinton, I: "International Conference on the Peaceful Uses of Atomic Energy," vol. 3, pp. 323 and 326, August 1955, U.N. Publication, N.Y.

Hinton, II: "Atomics," May 1954, pp. 147–151.

Goodman et al.: "Nucleonics," vol. 11, No. 3, March 1953.

Starr: "International Conference on the Peaceful Uses of Atomic Energy," vol. 3, pp. 98–115, August 1955, United Nations Publication, N.Y.